US012601325B2

(12) United States Patent
Sanchez Alarcon et al.

(10) Patent No.: US 12,601,325 B2
(45) Date of Patent: Apr. 14, 2026

(54) CURRENT TRANSFER ELEMENTS, ELECTRICAL MACHINES AND WIND TURBINES COMPRISING SUCH CURRENT TRANSFER ELEMENTS

(71) Applicant: General Electric Renovables Espana, S.L., Barcelona (ES)

(72) Inventors: Juan Sanchez Alarcon, Sant Vicenç de Castellet (ES); Francesca Capelli, Barcelona (ES)

(73) Assignee: GE Vernova Renovables Espana, S.L.U., Barcelona (ES)

( * ) Notice: Subject to any disclaimer, the term of this patent is extended or adjusted under 35 U.S.C. 154(b) by 133 days.

(21) Appl. No.: 18/595,931

(22) Filed: Mar. 5, 2024

(65) Prior Publication Data

US 2024/0301872 A1 Sep. 12, 2024

(30) Foreign Application Priority Data

Mar. 6, 2023 (EP) .................................... 23382208

(51) Int. Cl.
*F03D 80/30* (2016.01)
*H02G 13/00* (2006.01)

(52) U.S. Cl.
CPC ............. *F03D 80/30* (2016.05); *H02G 13/80* (2013.01); *F05B 2220/706* (2013.01); *F05B 2240/85* (2020.08)

(58) Field of Classification Search
CPC ..... F03D 80/30; H02G 13/80; F05B 2240/85; F05B 2220/706
USPC ....................................................... 361/220
See application file for complete search history.

(56) References Cited

U.S. PATENT DOCUMENTS

| | | | | |
|---|---|---|---|---|
| 9,222,467 | B2 * | 12/2015 | Thiel ....................... | F03D 80/30 |
| 2007/0114797 | A1 | 5/2007 | Krug et al. | |
| 2013/0062884 | A1 * | 3/2013 | Bonomi ................. | F03D 80/70 |
| | | | | 310/156.01 |

(Continued)

FOREIGN PATENT DOCUMENTS

| | | |
|---|---|---|
| EP | 1568883 A2 | 8/2005 |
| WO | WO2013084374 A1 | 6/2013 |

OTHER PUBLICATIONS

European Search Report Corresponding to EP23382208 on Aug. 4, 2023.

*Primary Examiner* — Michael R. Fin
(74) *Attorney, Agent, or Firm* — Dority & Manning, P.A.

(57) ABSTRACT

The present disclosure relates to a current transfer element (100) configured to be mounted on a first component (300) of a machine, the machine comprising a second component (200) configured to rotate with respect to the first component and the second component comprising an electrical conductor. The current transfer element (100) comprises a floating conductor assembly, and a support (120), and the floating conductor assembly comprises a floating chassis (111) resiliently connected to the support (120), the floating chassis arranged on a roller (112) which is configured to contact the second component (200), and carrying a floating conductor (113) configured to transfer current from the electrical conductor of the second component (200). The present disclosure further relates to generators and electrical machines comprising floating conductor assemblies, and direct drive wind turbines comprising such generators.

13 Claims, 5 Drawing Sheets

(56)         References Cited

U.S. PATENT DOCUMENTS

2019/0195203 A1      6/2019  Fujioka
2019/0203842 A1*    7/2019  Bidkar .................. F01D 11/003
2019/0360467 A1*   11/2019  Bager ................... F16D 1/0876

* cited by examiner

600

PROVIDE A CURRENT TRANSFER
ELEMENT                                602

INSTALL THE SUPPORT OF THE
CURRENT TRANSFER ELEMENT TO A          604
STATIC COMPONENT OF A MACHINE

CURRENT TRANSFER ELEMENTS, ELECTRICAL MACHINES AND WIND TURBINES COMPRISING SUCH CURRENT TRANSFER ELEMENTS

FIELD

The present disclosure relates to current transfer elements and electrical machines and wind turbines comprising such elements.

BACKGROUND

Electrical machines, such as motors and generators, generally comprise a rotor structure which rotates with respect to a stator structure. Such generators may be used for example in wind turbines.

The rotor may be the inner structure and the stator the outer structure. The stator in this case may radially surround the rotor. Alternatively, the configuration may be opposite to this, i.e. the rotor radially surrounds the stator.

Current transfer from the rotor to the stator might be needed in different circumstances. For example, in the case of a lightning strike, a current path may need to be provided from a rotor to a stator and further down the tower of the wind turbine in order to avoid damage to machine components and ensure a correct functioning of the machine. Spark gaps or carbon brushes may be used for this purpose.

Grounding systems are known to be used for electrically connecting the rotor of an electrical machine to ground, thereby providing a path for discharging e.g. undesired static electricity through an electrically grounded element. Carbon brushes may be used for this purpose.

In some occasions, an electrical machine comprising a grounding system may be subjected to deformations and undesired movements. These movements and deformations can affect the distance between the current transfer elements which have been carefully installed in the electrical machine and the rotor. Consequently, the correct functioning of the current transfer elements, and therefore, of the whole grounding system can be affected.

Such a problem may occur e.g. in direct drive wind turbine generators. Direct drive generators are very large electrical machines, whereas a distance between spark gap elements is preferably very small. Even small deformations and movements (e.g. due to wind gusts or other or component loads) may cause a problem. However, similar problems may occur in other electrical machines as well, particularly in large electrical machines and more particularly in large electrical machines exposed to significant external loads.

The present disclosure provides methods and devices to at least partially overcome some of the aforementioned drawbacks.

SUMMARY

In an aspect of the present disclosure, a current transfer element is provided. The current transfer element is configured to be mounted on a first component of a machine, the machine comprising a second component configured to rotate with respect to the first component and the second component comprising an electrical conductor. The current transfer element comprises a floating conductor assembly, and a support. Further, the floating conductor assembly comprises a floating chassis resiliently connected to the support. The floating chassis is arranged on a roller which is configured to contact the second component. The floating chassis carries a floating conductor configured to transfer current from the electrical conductor of the second component.

According to this aspect, an adjustable contact pressure between the floating conductor assembly and the second component is achieved and a distance between the floating conductor and the second component may be maintained. The position of the second component may vary during operation. Providing a floating chassis which is arranged on a roller configured to contact the second component and which is resiliently connected to a support enables an adjustment of the position of the current transfer element with a movement of the second component. An optimal distance may then be maintained.

In an additional aspect, an electrical machine comprising a stator and a rotor and an air gap radially arranged in between the stator and the rotor is provided. The stator comprises a current transfer element configured to conduct current from the rotor to the stator. The current transfer element comprises a roller configured to contact the rotor and a floating chassis carried by the roller and resiliently connected to the stator. The floating chassis carries a floating conductor configured to transfer current from the rotor to the stator.

In another aspect of the disclosure, a direct-drive wind turbine generator comprising a stator and a rotor and an air gap radially arranged in between the stator and the rotor is provided. The stator comprises a current transfer element configured to conduct current from the rotor to the stator. The current transfer element comprises a roller configured to contact the rotor and a floating chassis carried by the roller and resiliently connected to the stator. The floating chassis carries a floating conductor configured to transfer current from the rotor to the stator.

Additional objects, advantages and features of embodiments of the present disclosure will become apparent to those skilled in the art upon examination of the description, or may be learned by practice.

BRIEF DESCRIPTION OF THE DRAWINGS

FIG. 5b schematically illustrates an enlarged perspective view of one of the current transfer elements 100 mounted in the electrical machine shown in FIG. 5a;

FIG. 6 shows a flowchart of an example of a method for installing a current transfer element on a machine according to the present disclosure.

DETAILED DESCRIPTION OF EXAMPLES

Figure 1:
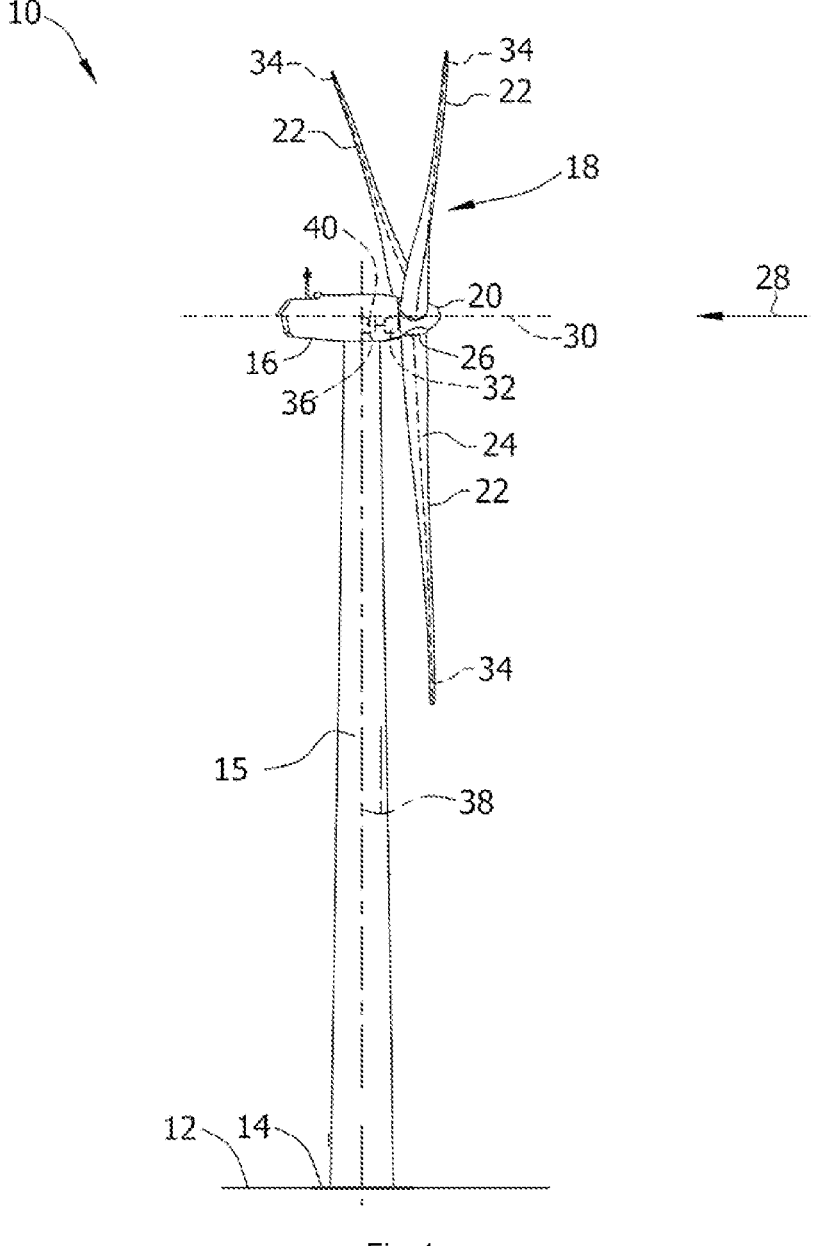
FIG. 1 schematically illustrates a perspective view of one example of a wind turbine.

Reference now will be made in detail to embodiments of the disclosure, one or more examples of which are illustrated in the drawings. Each example is provided by way of explanation, not as a limitation. In fact, it will be apparent to those skilled in the art that various modifications and variations can be made in the present disclosure without departing from the scope or spirit of the teaching. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a micro-computer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
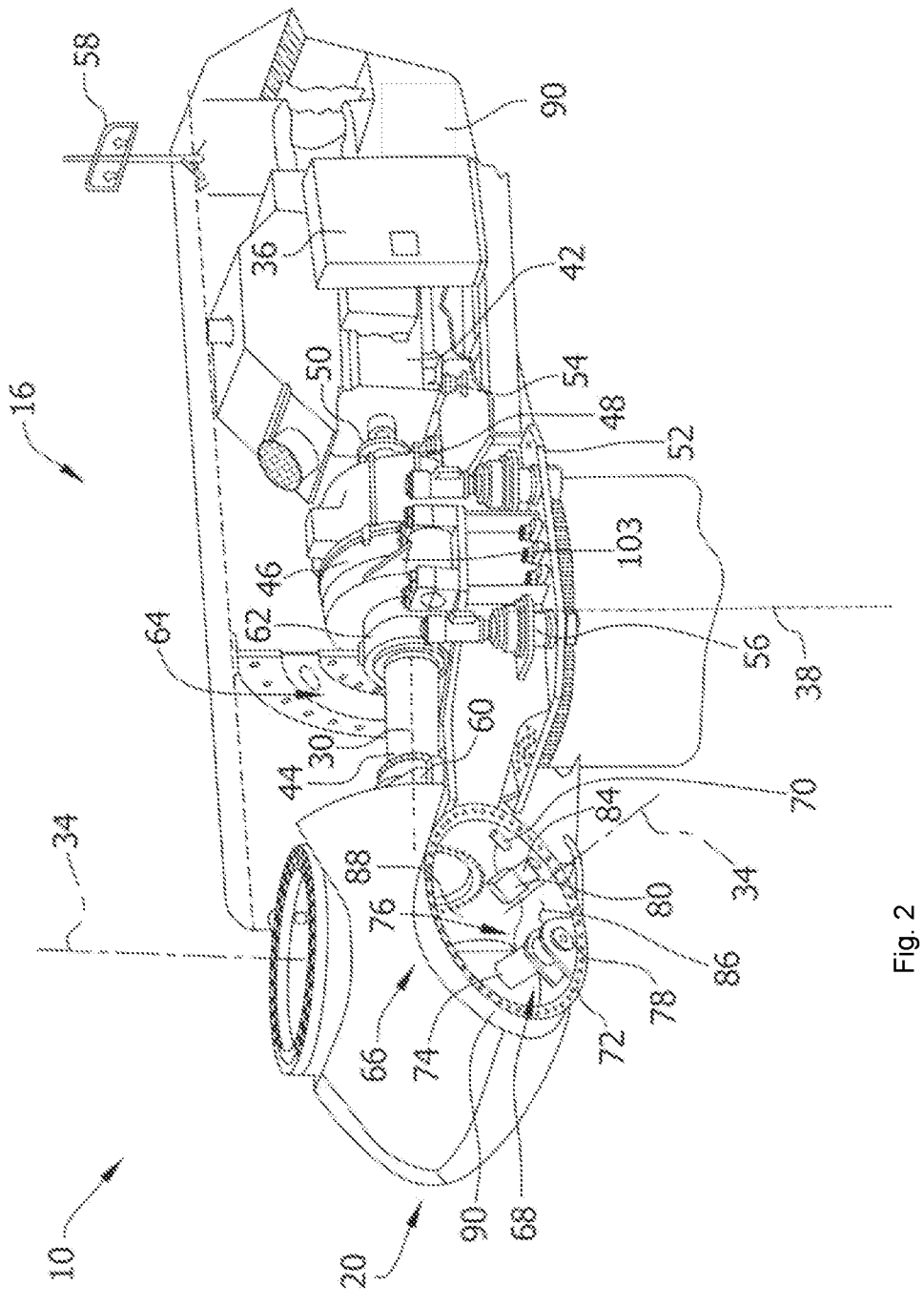
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage, e.g. 10-35 KV. Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer roof surface of hub 20 and may be coupled, directly or indirectly, to the outer roof surface.

Figure 3:
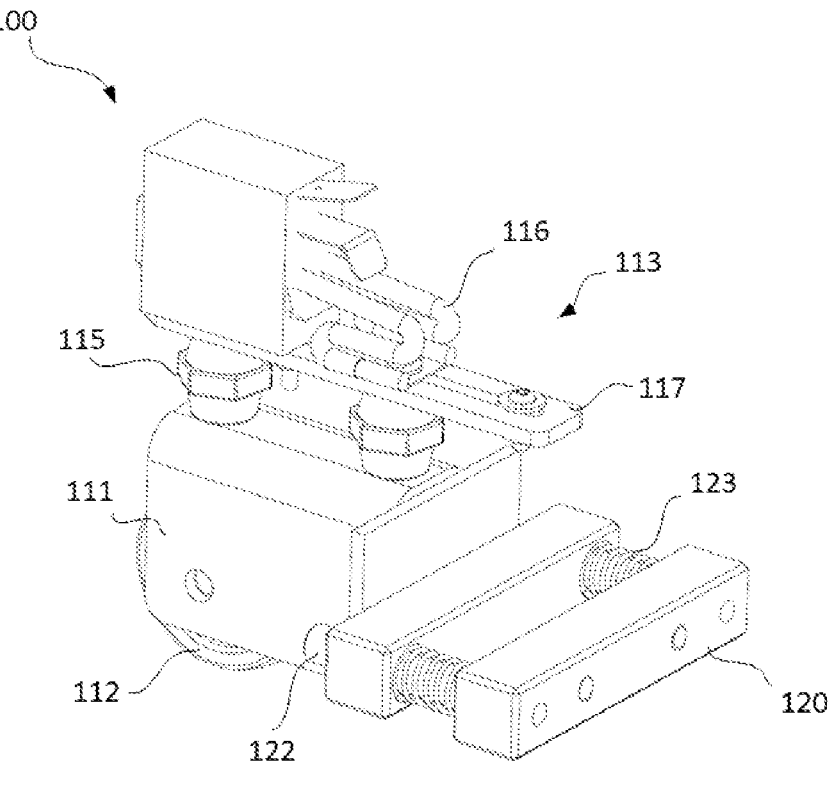
FIG. 3 schematically illustrates a perspective view of an example of a current transfer element according to the present disclosure.

FIG. 3 schematically illustrates a perspective view of an example of a current transfer element 100 according to an example of the present disclosure. The current transfer element 100 is configured to be mounted on a first component of a machine, the machine comprising a second component configured to rotate with respect to the first component and the second component comprising an electrical conductor. In particular, FIG. 3 shows a current transfer element 100 comprising a floating conductor assembly and a support 120. The floating conductor assembly comprises a floating chassis 111 resiliently connected to the support 120 and arranged on a roller 112. The roller 112 is configured to contact the second component. The floating chassis 111 carries a floating conductor 113. The floating conductor 113 is configured to transfer current from the electrical conductor of the second component.

Providing a floating chassis resiliently connected to a support enables an adjustment of the axial position of the current transfer element, and therefore of the distance between the floating conductor and the second component. The second component of the machine may tilt, or otherwise move or deform. These movements may influence the current transfer. Resiliently connecting the floating chassis to the support provides a current transfer element which may stay at a nominal distance from the second component of the machine, even when the second component undergoes various kinds of (undesired) movements. Damage to the current transfer elements may be avoided even in case of significant movements or deformations.

The current transfer element 100 may be configured to be mounted on an electrical machine comprising a rotor and a stator. Accordingly, the support 120 of the current transfer element, may be configured to be mounted on a static component of the electrical machine, i.e. the stator. Further, the roller 112 of the current transfer element may be configured to contact a rotor of the electrical machine. I.e. the first component may be the stator the electrical machine, whereas the second component may be the rotor of the electrical machine in this example. Current from the rotor of an electrical machine may therefore be transferred to the current transfer element, which may transfer the current to ground, and damage of the electrical machine may be prevented.

In other examples, the support 120 of the current transfer element might be mounted on the rotor of an electrical machine, and the roller 112 may contact the stator, i.e. the first component may be the rotor, and the second component may be the stator.

In some examples, the floating chassis 111 may have a substantially cuboid shape. The floating chassis may have any other suitable shape e.g. round shape. In addition, the floating chassis 111 may comprise one or more holes configured to at least partially receive one or more shafts of the support 120. In some examples, the holes may be through holes. The floating chassis may be resiliently connected to the support through the holes, enabling the floating chassis 111 to be moved in an axial direction.

As shown in FIG. 3, the floating chassis 111 is arranged on a roller 112. The roller 112 may be made of a substantially electrically non-conductive material such that current may not be transferred from the current transfer element to the second component of the machine e.g. back to a rotor through the roller. The roller is configured to contact the second component of the machine, and therefore may be made of any suitable wear-resistant material. The floating chassis 111 may be moved in an axial direction along the shafts of the support, and a contact pressure between the roller 112 and the second component of the machine may be adjusted.

The floating chassis 111 carries a floating conductor 113. The floating conductor 113 may be any element which may be configured to transfer current from the electrical conductor of the second component of the machine. The floating conductor 113 may be at least one of a carbon brush 116 or a spark gap 117.

In some examples, the floating conductor may be part of a grounding system and may provide a current path from the electrical conductor of the second component of the machine to the ground. In other examples, the floating conductor 113 may be part of a lightning protection system, which may protect the machine from lightning by providing a path to conduct lightning current from the electrical conductor of the second component of the machine to the ground.

Throughout the present disclosure, ground may be understood as a direct connection to the Earth e.g. through the wind turbine tower.

In examples, the floating conductor may be a spark gap as part of a lightning protection system, which may be separated in an axial direction from the second component of the machine. In some examples, the floating conductor may be a first electrode of a spark gap which is separated in an axial direction from a second electrode of the spark gap on the second component of the machine. The first and second electrodes need to be at a minimum distance e.g. less than 2 mm so that current transfer between them is ensured. Providing a floating chassis carrying a spark gap, arranged on a roller contacting the second component and resiliently connected to a support may ensure a minimum distance between the first and second electrodes of the spark gap even when the second component is under tilt movements.

In some examples, the floating conductor 113 may be a carbon brush 116 which may extend in an axial direction and may contact the second component, forming a current path from the second component to the ground. Contact pressure between the carbon brush and the second component may be decisive for ensuring an effective current transfer. The carbon brush 116 may be arranged in the floating chassis 111 with a brush holder. A carbon brush may be used for electrical discharge and avoiding build-up of static electricity between rotor and stator.

Movements of the machine may alter the contact pressure between the carbon brush and the second component of the machine, which is crucial for the proper functioning of the carbon brush. An excessive contact pressure may lead to a quick wear down of the brush, which may end up in fatal damage of the carbon brush, whereas poor contact between the carbon brush and the second component results in failure in transferring the current. The current transfer element 100 of the present disclosure may allow adjusting the axial position of a carbon brush carried by the floating chassis 111 and may ensure a suitable contact pressure between the carbon brush and the second component of the machine.

Further, the floating conductor 113 may be fixedly attached to the floating chassis 111 such that axial movement of the floating chassis 111 may result in axial movement of the floating conductor 113. This may allow adjustment of the axial position of the floating conductor assembly, which may ensure an effective current transfer, since for an optimal functioning, the floating conductor 113 needs to be positioned at a certain distance from the second component of the machine in order to transfer current effectively.

In some examples, the current transfer element 100 may comprise a first electrical conductor and a second electrical conductor. As shown in FIG. 3, the current transfer element 100 may comprise two electrical conductors positioned in parallel. The exemplary current transfer element of FIG. 3 comprises a spark gap 117 attached to the floating chassis 111 and a carbon brush 116 arranged in a brush holder and positioned parallel to the spark gap 117. A current transfer element comprising two electrical conductors may be more reliable than a current transfer element comprising only one electrical conductor, since an additional current path may be provided. The second electrical conductor may also act as a backup in case of failure of the first electrical conductor.

The floating chassis 111 may be attached to the floating conductor 113 via at least an electrical insulator 115. FIG. 3 shows a floating chassis 111 attached to a floating conductor 113 with two electrical insulators. The use of electrical insulators may ensure that the current follows a path to ground.

Further, the current transfer element 100 comprises a support 120. The support 120 may be the part of the current transfer element which may be mounted on the first component of the machine. In addition, the support 120 may comprise one or more shafts which may extend through the holes in the floating chassis 111, connecting the support to the floating chassis. In the example of FIG. 3, the support 120 may comprise two shafts 122 which may extend through two holes of the floating chassis.

As shown in FIG. 3, the floating chassis 111 of the current transfer element is resiliently connected to the support 120. In some examples, the floating chassis 111 may be resiliently connected to the support through one of springs 123 and a hydraulic shock absorber. Springs 123 may be helicoidal springs arranged around shafts 122. The springs or the hydraulic shock absorber may transmit pressure to the floating chassis, which may lead to an axial movement of the floating conductor assembly adjusting contact pressure between the roller and the second component.

Therefore, resiliently connecting the floating chassis to the support may provide a current transfer element which is able to maintain a constant distance with the second component of a machine, even when tilting movements are involved. Axial adjustment of the position of the floating conductor assembly may be enabled and distance between the floating conductor and a second component of a machine may be adjusted.

Figure 4:
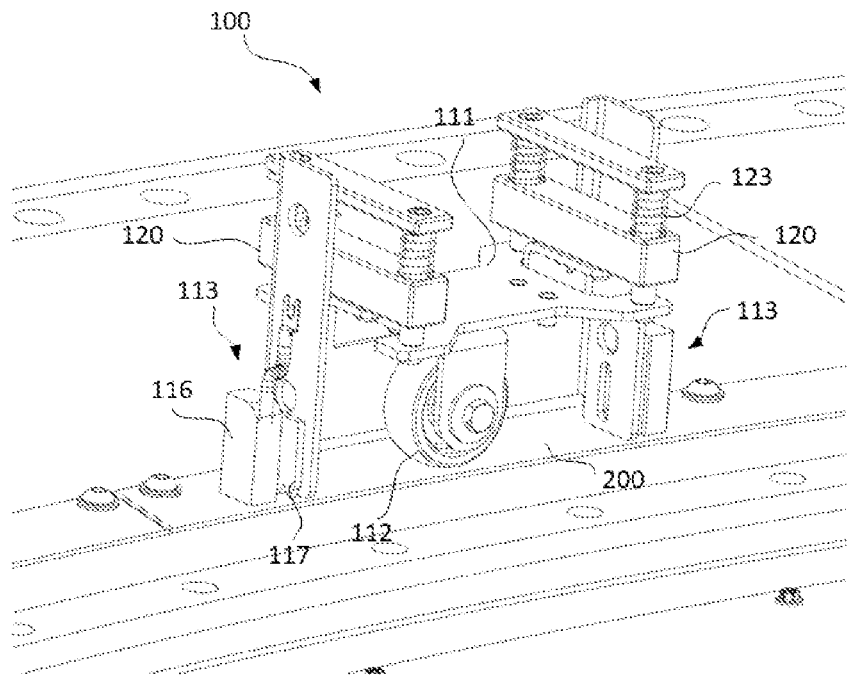
FIG. 4 schematically illustrates a perspective view of a further example of a current transfer element.

FIG. 4 illustrates another example of a current transfer element 100. In the example of FIG. 4, the current transfer element 100 comprises a first and a second support 120 and a floating conductor assembly comprising a first and a second floating conductor 113. FIG. 4 also shows that the roller 112 of the floating conductor assembly is contacting a second component 200 of a machine e.g. a rotor of an electrical machine.

The floating conductor assembly illustrated in FIG. 4 may comprise a floating chassis 111 which may be resiliently connected to the first and second support 120. Each of the supports may comprise one or more shafts which may extend through holes in the floating chassis, connecting each support to the floating chassis.

Further, the floating chassis 111 may be arranged on a roller 112 which may be located between the two supports 120. The floating chassis 111 may carry a first and a second floating conductor 113 configured to transfer current from an electrical conductor of the second component. The first and second floating conductor 113 may be positioned at opposite sides of the roller 112 i.e. the roller 112 may be positioned in between the first and second floating conductor 113.

In the example of FIG. 4, each of the floating conductors 113 comprises a spark gap 117 and a brush holder 116 positioned in parallel which are configured to transfer current from an electrical conductor of the second component 200 to ground. A current transfer element 100 comprising two floating conductors 113 and two supports 120 may enhance current transfer from the second component to ground, providing a more reliable current transfer element.

In other examples, the first and second floating conductors 113 may comprise different electrical conductors e.g. the first floating conductor may comprise a spark gap 117 and the second floating conductor may comprise a carbon brush 116.

Figure 5A:
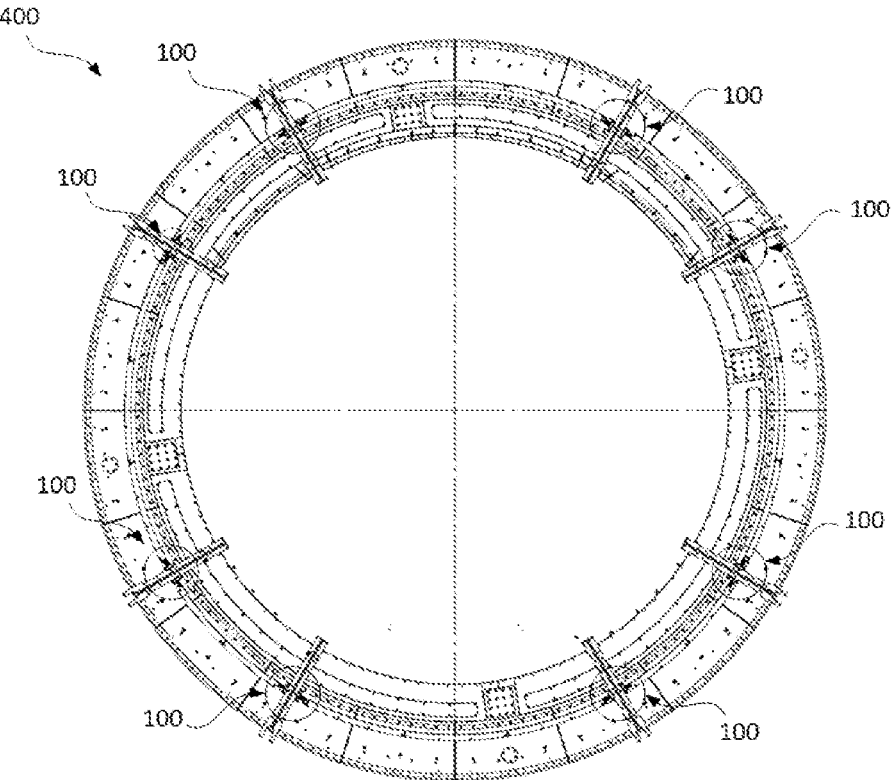
FIG. 5a schematically illustrates an electrical machine comprising the current transfer element from FIG. 4.

In FIG. 5a, an electrical machine 400 comprising the current transfer element 100 from FIG. 4 is schematically represented. The electrical machine 400 comprises a stator and a rotor and an air gap radially arranged in between the stator and the rotor. The stator comprises a current transfer element 100 configured to conduct current from the rotor to the stator. The current transfer element 100 comprises a roller 112 configured to contact the rotor and a floating chassis 111 carried by the roller and resiliently connected to the stator, the floating chassis carrying a floating conductor configured to transfer current from the rotor to the stator.

The electrical machine 400 may comprise one or more current transfer elements 100. As schematically illustrated in FIG. 5a, the electrical machine 400 may comprise eight current transfer elements 100 circumferentially spaced along the electrical machine and configured to conduct current from the rotor to the stator.

Figures 5B, 6:
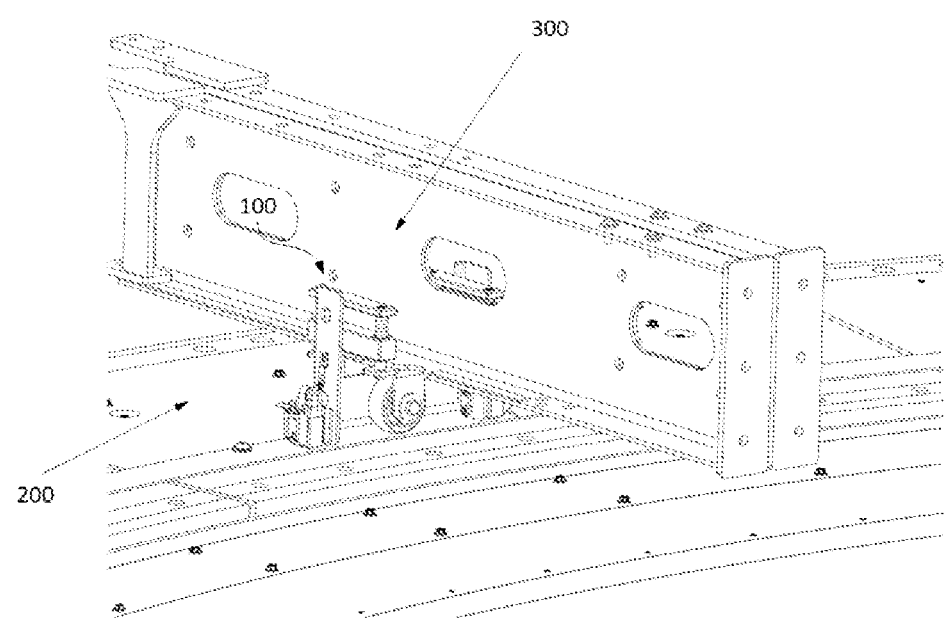

FIG. 5b is an enlarged perspective view of one of the current transfer elements 100 mounted in the electrical machine 400 shown in FIG. 5a. The current transfer element 100 comprises a roller 112 which is in contact with the rotor 200 of the machine. FIG. 5b also shows that the floating chassis 111 of the current transfer element 100 is resiliently connected to a static component 300 of the machine, wherein the static component 300 may be the stator of the machine.

The static component 300 is axially separated from the rotor. The roller 112 moves along with axial movements or deformations from the rotor. The floating conductor assembly axially moves with the movements or deformations as well, while the springs (as illustrated before) are compressed and expanded.

In another aspect of the disclosure, a direct-drive wind turbine is provided. The direct-drive wind turbine comprises a stator and a rotor and an air gap radially arranged in between the stator and the rotor. The stator comprises a current transfer element 100 configured to conduct current from the rotor to the stator. The current transfer element 100 comprises a roller 112 configured to contact the rotor, and a floating chassis 111 carried by the roller 112 and resiliently connected to the stator, the floating chassis carrying a floating conductor 113 configured to transfer current from the rotor to the stator.

The floating conductor 113 may be a carbon brush 116 which may extend in an axial direction to contact the rotor of the direct-drive wind turbine. Further, the floating conductor 113 may be a first electrode of a spark gap 117 which may be separated in an axial direction from a second electrode of the spark gap 117 on the rotor of the direct-drive wind turbine. In some examples, the floating chassis 111 may carry two floating conductors 113.

The floating chassis 111 may be resiliently connected to the support through one of springs 123 and a hydraulic shock absorber.

In addition, the floating conductor 113 may be part of a grounding system and/or a lightning protection system.

In yet another aspect of the disclosure, a method for installing a current transfer element 100 on a machine is disclosed. Method 600 is schematically illustrated in FIG. 6.

The method 600 comprises, at block 602, providing a current transfer element 100 comprising a floating chassis 111 resiliently connected to a support 120, and wherein the floating chassis 111 carries a floating conductor 113 and is arranged on a roller 112. Further, the method comprises, at block 604, installing the support 120 of the current transfer element to a static component 300 of the machine, the roller 112 of the transfer element contacting with a rotary component 200 of the machine which comprises an electrical conductor.

The rotary component of the machine may be subjected to tilt movements. These movements may affect a correct functioning of the floating conductor i.e. current may not be successfully transferred from the rotary component to the floating conductor. The method provides a reliable way of electrically connecting a rotary component with a static component, even when they are under the influence of tilt movements.

A distance between the floating conductor and the rotary component may be adjusted by the resilient support. The resilient support may adjust the axial position of the floating chassis arranged on the roller.

In some examples, adjusting the distance between the floating conductor and the rotary component comprises maintaining a substantially constant distance. When a distance between the floating conductor and the rotary component is too low, the resilient support may move the floating conductor assembly towards the support. When a distance between the floating conductor and the rotary component exceeds a threshold, the resilient support may move the floating conductor assembly in an axial direction towards the rotary component. Adjusting the distance between the floating conductor and the rotary component may thus enable maintaining the electrical conductors at a constant distance from the second component of the machine, even when the second component undergoes various kinds of (undesired) movements or deformations.

The current transferred from the rotary component to the current transfer element may be transferred to ground through the static component.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An electrical machine, comprising:
a stator;
a rotor comprising an electrical conductor, the rotor configured to rotate relative to the stator, and wherein an air gap is defined between the stator and the rotor;
a current transfer element mounted on the stator, the current transfer element comprising:
a floating conductor assembly;
a support fixedly attached to the stator;
the floating conductor assembly comprising a floating chassis resiliently connected to the support, the floating chassis arranged on a roller that is configured to contact the rotor; and
the floating chassis carrying at least one floating conductor configured to transfer current from the electrical conductor of the rotor.

2. The electrical machine according to claim 1, wherein the roller is made of an electrically non-conductive material.

3. The electrical machine according to claim 1, wherein the floating conductor is part of a grounding system.

4. The electrical machine according to claim 1, wherein the floating conductor is part of a lightning protection system.

5. The electrical machine according to claim 1, wherein the floating conductor comprises a carbon brush or a spark gap.

6. The electrical machine according to claim 1, wherein the floating conductor comprises at least two electrical conductors positioned in parallel.

7. The electrical machine according to claim 1, wherein the floating chassis is attached to the floating conductor via at least an electrical insulator.

8. An electrical machine, comprising:
a stator;
a rotor comprising an electrical conductor, the rotor configured to rotate relative to the stator, and wherein an air gap is defined between the stator and the rotor;
a current transfer element mounted on the stator, the current transfer element comprising:
a floating conductor assembly;
a support fixedly attached to the stator;
the floating conductor assembly comprising a floating chassis resiliently connected to the support, the floating chassis arranged on a roller that is configured to contact the rotor;
the floating chassis carrying at least one floating conductor configured to transfer current from the electrical conductor of the rotor; and
wherein the floating chassis is slidable along one or more shafts fixed to the support and extending through the floating chassis, the floating chassis biased away from the support via a spring arranged concentric with each of the one or more shafts.

9. The electrical machine according to claim 1, wherein the floating chassis carries two floating conductors.

10. The electrical machine according to claim 1, wherein the floating conductor is configured to transfer current from the electrical conductor of the second component to ground.

11. The electrical machine according to claim 1, wherein the floating conductor comprises one of: a carbon brush extending in an axial direction to contact the rotor, or a first electrode of a spark gap separated in an axial direction from a second electrode of the spark gap on the rotor.

12. The electrical machine according to claim 1, wherein the electrical machine is a generator.

13. A direct-drive wind turbine, comprising:
a generator configured as the electrical machine according to claim 1.

* * * * *